United States Patent
Adi et al.

(10) Patent No.: US 8,078,556 B2
(45) Date of Patent: Dec. 13, 2011

(54) GENERATING COMPLEX EVENT PROCESSING RULES UTILIZING MACHINE LEARNING FROM MULTIPLE EVENTS

(75) Inventors: Asaf Adi, Qiryat Ata (IL); Elad Yom-Tov, DN Hamovil (IL)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 12/033,896

(22) Filed: Feb. 20, 2008

(65) Prior Publication Data
US 2009/0210364 A1   Aug. 20, 2009

(51) Int. Cl.
*G06F 15/18* (2006.01)
*G06F 17/00* (2006.01)

(52) U.S. Cl. ............... 706/16; 706/45; 706/46; 706/47; 706/59

(58) Field of Classification Search ............ 706/16, 706/45–47
See application file for complete search history.

(56) References Cited

U.S. PATENT DOCUMENTS 6,604,093 B1 * 8/2003 Etzion et al. .................. 706/47
7,356,522 B2 * 4/2008 Herrera et al. ................ 706/47

OTHER PUBLICATIONS

Luckham, David C. and Frasca, Brian. Complex Event Processing in Distributed Systems. Stanford University Technical Report CSL-TR-98-754, 1998.*
TIBCO—Predictive Customer Interaction Management, 2006, TIBCO Software Inc.
TIBCO—Complex Even Processing, May 16, 2007, TIBCO Software Inc.

* cited by examiner

*Primary Examiner* — Jeffrey A Gaffin
*Assistant Examiner* — Ola Olude Afolabi

(57) ABSTRACT

A novel and useful mechanism enabling a standard learning algorithm to generate rules for complex event processing (CEP) systems. The method creates rules that infer previously defined output events by creating input event feature vectors for each targeted output event. In addition, a method for automatically generating CEP system rules to infer output events which are anomalies (i.e. statistical outliers) of input event sequences is disclosed. Input feature vectors consisting of multiple input events and parameters for each targeted output event are then input into a standard learning algorithm to generate CEP system rules.

20 Claims, 8 Drawing Sheets

22 — CLASSNAME="INMSG_WindowsApplicationEventLogRecord">
24 — DateTimeOfCollection=20051110132232.615000
26 — EventID=8000
28 — LogName=ApplicEvent
30 — Message="Begin Backup of "System State" Verify: Off, Mode: Append, Type: Copy
32 — Source=NTBackup

20

| RULE # | CATEGORY | CRITERIA | EXPLANATION |
|---|---|---|---|
| 1 | SYSTEM | (ueventID=26 (t−26) > 58) & (usource=Print (t−21) < 620.5) | TOO MANY FAILED WRITES INTO A SYSTEM WHICH ID NOT A PRINT SERVER |
| 2 | APPLICATION | (time_vec(t−22) > 4854.5) | TOO MANY APPLICATIONS EVENTS IN THE PAST 3 WEEKS |
| 3 | APPLICATION | (ueventID=17055 (t−22) > 872.5) & (time_vec(t−22) < 4854.5) | SQL SERVER KEEPS FAILING |
| 4 | SECURITY | (time_vec(t−7) < 6352) & (time_vec(t−14) > 5083) & (time_vec(t−1) < 1534 & ueventID=552 (t−1) < 2.5) | LARGE DROP IN ACTIVITY |
| 5 | SYSTEM | (ueventID=26 (t−26) > 58) & (usource=print (t−21) < 620.5) | NOT A PRINT SERVER, BUT STILL SHOWING MANY GENERAL WINDOWS POPUP MESSAGES |
| 6 | APPLICATION | (ueventID=4 (t=0) < 3) & (usource=print (t−21) > 620.5) | THE NETWORK LINKS IS DOWN IN A PRINTER SERVER |

FIG.5

GENERATING COMPLEX EVENT PROCESSING RULES UTILIZING MACHINE LEARNING FROM MULTIPLE EVENTS

FIELD OF THE INVENTION

The present invention relates to the field of complex event processing and more particularly relates to a more efficient automated method of generating complex event processing system rules to infer a specific output event based on a stream of input events.

BACKGROUND OF THE INVENTION

Complex event processing (CEP) systems, also known as event processing systems (EPS), apply rules to streams of incoming events based on the timing and parameters of the events as well as additional data. CEP systems deal with the task of processing multiple events from an event stream with the goal of generating new events based on predefined rules.

An example prior art system utilizing CEP techniques is shown in FIG. 1. The automobile, generally referenced 10, comprises chassis 11, tires 12, 13, 14, 15, tire pressure sensor 16, speed sensor 17, airbag sensor 18 and emergency communication device 19. If automobile 10 blows a tire, which results in automobile 10 leaving the road, striking a tree and inflating the airbags. Sensors on board automobile 10 record the following sequence of events transpiring in rapid succession: (1) tire pressure sensor 16 identifies a rapid loss of tire pressure, generating a "BlowOutTire" event, (2) speed sensor 17 identifies that the car has stopped, generating a "ZeroSpeed" event and (3) airbag sensor 18 identifies that the airbags have inflated, generating a "AirbagInflate" event. Based on previously defined manually described rules, a CEP system will determine that an accident has likely occurred, and instruct communication device 19 to notify the police. Even though there is no direct measurement that can determine conclusively that the car struck a tree (or that there was even an accident for that matter), the combination of events enables the situation to be detected and a new event to be created to signify the detected situation. This is the essence of a complex (or composite) event. It is complex because the situation cannot be directly detected; the situation is inferred or deduced from the occurrence of a combination of specific events.

CEP systems can be implemented by technical support help desks to identify the cause of system problems through system log analysis. An example prior art entry in a system log is shown in FIG. 2. The log entry, generally referenced 20, describes an event and comprises system log message class 22, event time 24, event identifier 26, system log name 28, event description 30 and event source 32.

For example, a system log records the following information: (1) a user group is deleted and (2) there are multiple unsuccessful login attempts to that user group. Using machine learning methods to automatically analyze system log data coupled with records of phone calls to the help desk to notify a problem enables a rule to be written that identifies a situation where a user group is deleted and there are multiple unsuccessful logins. The rule can then be used to inform the system administrator that the user group is deleted. Alternatively, the rule can be used to assist the help desk representative in identifying the problem.

SUMMARY OF THE INVENTION

Rules for CEP systems are currently either written by human operators using their knowledge of the system or generated automatically by machine learning methods when rules are inferred from single input events, even for instances when the input event will not cause an output event to be generated. Automatically generating rules for streams of multiple events is currently not possible.

The present invention provides a solution to the prior art problems discussed above by enabling a standard learning algorithm to generate rules for complex event processing (CEP) systems. The present invention provides a method of creating rules that infer one or more previously defined output events. Targeted output events are flagged, and an input event feature vector consisting of a plurality of input events and parameters is created for each output event. Output events and their associated input event feature vectors are then input into a standard learning algorithm to generate the CEP system rules.

The present invention also provides a method to automatically generate CEP system rules to infer output events based on anomalies (i.e. statistical outliers) in the input event stream. Anomalies are detected by first generating input event feature vectors. These input vectors are used by standard anomaly detection algorithms to identify anomalies in the input event streams and generate output events based on these anomalies. Both the occurrence of an anomaly and the rule for identifying it are inferred by the anomaly detection algorithm.

The invention is operative to facilitate the development of analytic tools to monitor the performance of any system generating a system log file. Automated analysis of system log files will help optimize system performance and help in the timely isolation and identification of any problems before or after they occur. Both system support costs and system downtime can be reduced since the present invention provides a more efficient method for both centralized help desks and system administrators to prevent and detect system problems.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of creating an input event feature vector for use as input to a standard learning algorithm, the method comprising the steps of defining the characteristics of said input event feature vector, gathering a plurality of input events, populating individual vector elements of said input event feature vector based on a subset of said plurality of input events and constructing said input event feature vector from said individual vector elements.

There is also a method of generating one or more complex event processing system rules for inferring a previously identified output event based on a plurality of input events, the method comprising the steps of creating an output event feature vector for observed instances of said previously defined output events, generating an input event feature vector for each observed instance of said previously defined output event and executing a standard classification algorithm using said output event feature vector and said input event feature vectors as inputs, thereby extracting one or more complex event processing rules incorporating one or more said input events and their associated parameters.

There is further a method of establishing complex event processing system rules for detecting input event anomalies, the method comprising the steps of defining a time window and time resolution for collecting a plurality of input events, creating an input event feature vector for each said time resolution and executing a standard anomaly detection algorithm using a plurality of said input event feature vectors as inputs, thereby extracting one or more complex event processing system rules for detection of anomaly input events.

There is also provided a computer program product comprising a computer usable medium having computer usable program code for establishing complex event processing system rules from streams of input and output events, including computer usable program code for creating an output event feature vector, computer usable program code for generating an input event feature vector for each element of said output event feature vector and computer usable program code for executing a standard learning algorithm using said of output event feature vector and said input event feature vectors as inputs, thereby extracting one or more complex event system processing rules.

BRIEF DESCRIPTION OF THE DRAWINGS

The invention is herein described, by way of example only, with reference to the accompanying drawings, wherein:

FIG. 5 is a sample output of complex event processing system rules generated by the present invention;

DETAILED DESCRIPTION OF THE INVENTION

Notation Used Throughout

Figures 1, 2:
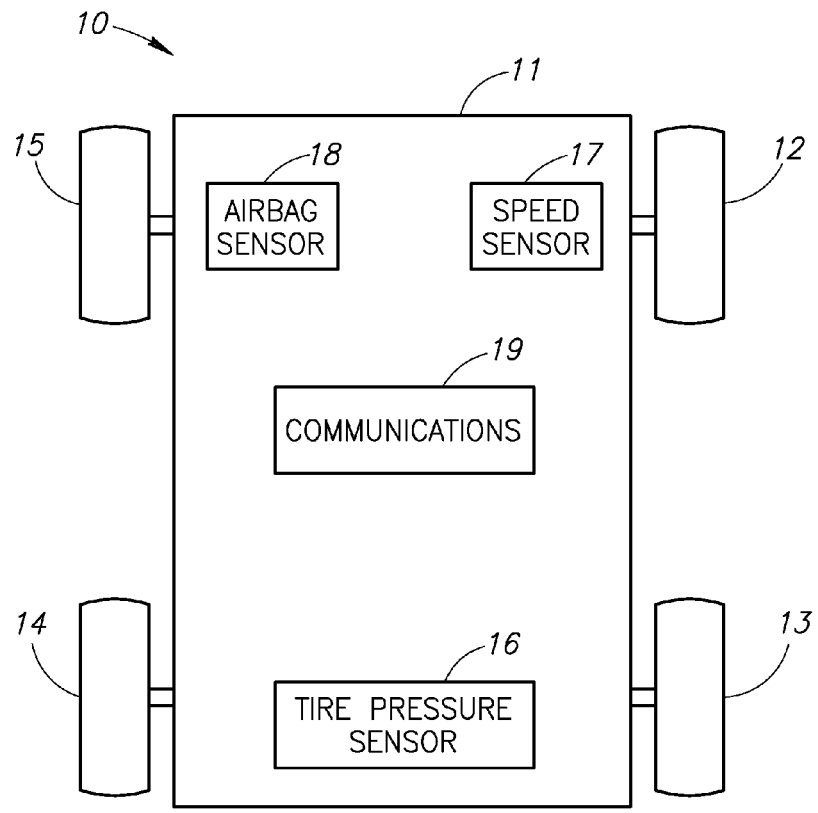
FIG. 1 is a diagram of sample implementation of a complex event processing (CEP) implemented in an automobile, illustrating the prior art.
FIG. 2 is a system log entry illustrating the prior art.

The following notation is used throughout this document:

| Term | Definition |
| --- | --- |
| ASIC | Application Specific Integrated Circuit |
| CD-ROM | Compact Disc Read Only Memory |
| CEP | Complex Event Processing |
| CPU | Central Processing Unit |
| DSP | Digital Signal Processor |
| EEROM | Electrically Erasable Read Only Memory |
| EPS | Event Processing System |
| FPGA | Field Programmable Gate Array |
| FTP | File Transfer Protocol |
| HDL | Hardware Description Language |
| HTTP | Hyper-Text Transport Protocol |
| I/O | Input/Output |
| LAN | Local Area Network |
| NIC | Network Interface Card |
| RAM | Random Access Memory |
| ROM | Read Only Memory |
| SVM | Support Vector Machine |
| WAN | Wide Area Network |

Detailed Description of the Invention

The present invention provides a solution to the prior art problems discussed supra by enabling a standard learning algorithm to generate rules for complex event processing (CEP) systems. The present invention provides a method of creating rules that infer one or more previously defined output events. Targeted output events are flagged, and an input event feature vector consisting of a plurality of input events and parameters is created for each output event. Output events and their associated input event feature vectors are then input into a standard learning algorithm to generate the CEP system rules.

The present invention also provides a method to automatically generate CEP system rules to infer output events based on anomalies (i.e. statistical outliers) in the input event stream. Anomalies are detected by first generating input event feature vectors. These input vectors are used by standard anomaly detection algorithms to identify anomalies in the input event streams and generate output events based on these anomalies. Both the occurrence of an anomaly and the rule for identifying it are inferred by the anomaly detection algorithm.

One application of the invention is to facilitate the development of analytic tools to monitor the performance of any system generating a system log file. Automated analysis of system log files will help optimize system performance and help in the timely isolation and identification of any problems before or after they occur. Both system support costs and system downtime can be reduced since the present invention provides a more efficient method for both centralized help desks and system administrators to prevent and detect system problems. In this case, output events can be, for example, the fact that a computer user calls a support center.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Note that the invention can take the form of an entirely hardware embodiment, an entirely software/firmware embodiment or an embodiment containing both hardware and software/firmware elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device.

Figure 3:
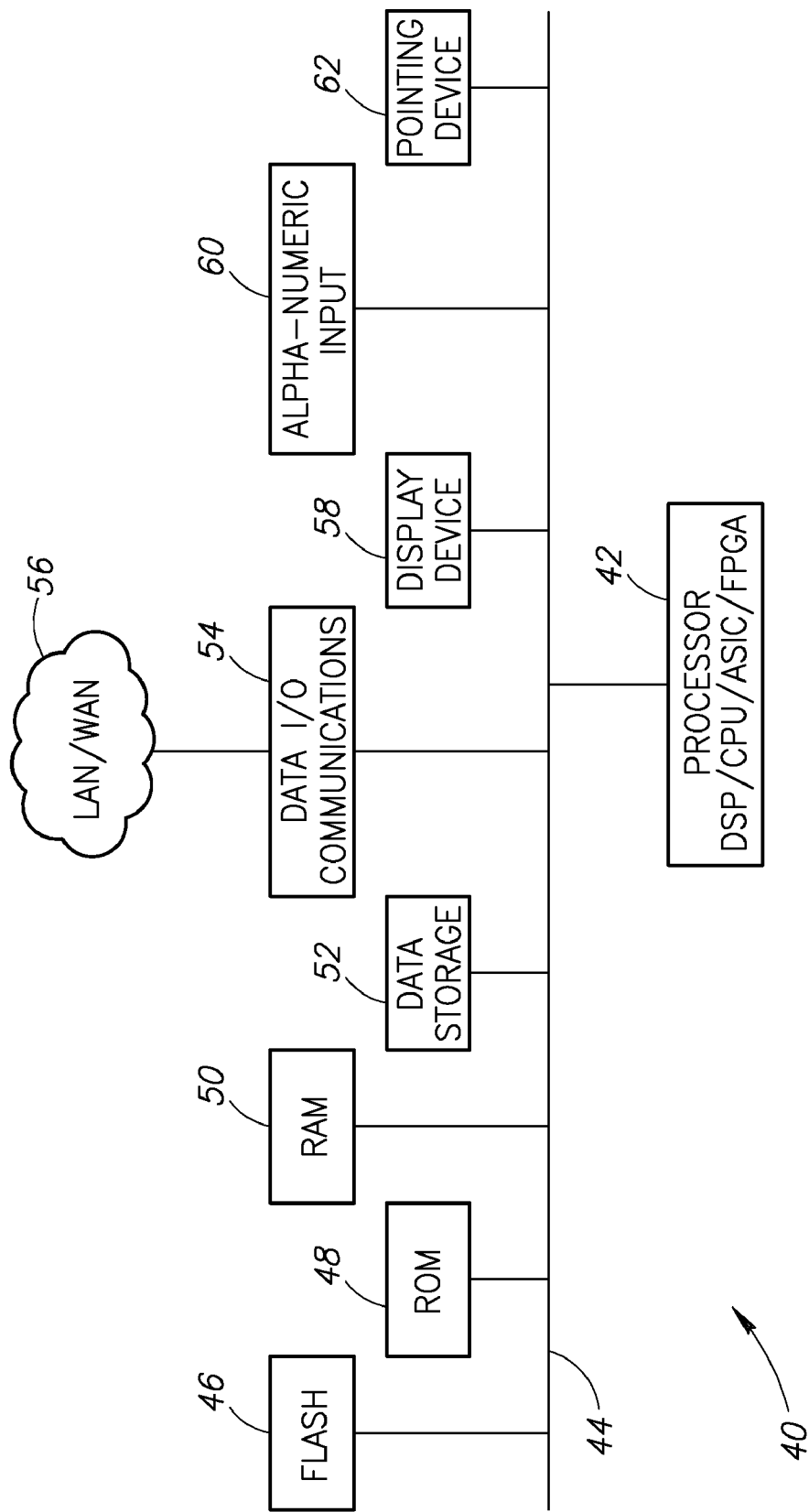
FIG. 3 block diagram illustrating an example computer processing system adapted to implement the CEP rule generation mechanism of the present invention.

A block diagram illustrating an example computer processing system adapted to implement the complex event processing system rule generation mechanism of the present invention is shown in FIG. 3. The computer system, generally referenced 40, comprises a processor 42 which may comprise a digital signal processor (DSP), central processing unit (CPU), microcontroller, microprocessor, microcomputer, ASIC or FPGA core. The system also comprises static read only memory 48 and dynamic main memory 50 all in communication with the processor. The processor is also in communication, via bus 44, with a number of peripheral devices that are also included in the computer system. Peripheral devices coupled to the bus include a display device 58 (e.g., monitor), alpha-numeric input device 60 (e.g., keyboard) and pointing device 62 (e.g., mouse, tablet, etc.)

The computer system is connected to one or more external networks such as a LAN or WAN 56 via communication lines connected to the system via data I/O communications interface 54 (e.g., network interface card or NIC). The network adapters 54 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 52 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the complex event processing system rule generation mechanism of the present invention is adapted to reside on a computer readable medium, such as a magnetic disk within a disk drive unit. Alternatively, the computer readable medium may comprise a floppy disk, removable hard disk, Flash memory 46, EEROM based memory, bubble memory storage, ROM storage, distribution media, intermediate storage media, execution memory of a computer, and any other medium or device capable of storing for later reading by a computer a computer program implementing the method of this invention. The software adapted to implement the complex event processing system rule generation mechanism of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the complex event processing system rule generation mechanism of the present invention, and to the extent that a particular system configuration is capable of implementing the system and methods of this invention, it is equivalent to the representative digital computer system of FIG. 3 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

Automated Complex Event Processing System Rule Generation

In accordance with the invention, output events are first targeted for monitoring. Targeted output events are either predefined or determined through an initial analysis. An example of a predefined output event is a call to help desk. In this case a complex event processing (CEP) rule can be created to infer why the help desk was contacted. When implemented, the CEP system rule enables the system to proactively detect the situation prior to the call to the help desk being called. Another use would be to directing the help desk to the cause of the situation. Alternatively, input events can be defined as anomaly events. In this case sequences of input events are analyzed and statistical outliers are identified. Output events which flag statistical outliers are then reviewed to determine whether CEP system rules are to be generated to infer the statistical outlier output event.

Once targeted output events are identified, targeted output events and their parameters are collected for a specific observation period. Using the example help desk calls discussed supra, an output event parameter is defined as the reason for the call to the help desk. Observed targeted output events and their parameters are then stored in an output event feature vector. If no output event is observed then a time window is collected without an output event, in order to identify rules to distinguish between instances where output events occur and instances where output events do not occur.

The next step is to create an input event feature vector for each element of the output event feature vector. Input event feature vectors for the present invention are defined by first identifying one or more fields in the input events, a metric by which each field is measured and defining the maximal relevant window and minimal resolution for linking events into features. A feature vector then is constructed for each output event in the training event stream (or, when anomaly detection is attempted, for each time instance). Each input feature vector element consists of a count of the number of events that occurred for each combination of input fields within each resolution up to the maximal relevant window.

For example, one input event feature vector metric may be time, related to the arrival time of the event. A maximal time window may be 30 days and a minimal resolution is one day. In this case, 30 of the features will be the count of events in the day that the output event occurred, the count in the past two days, etc, up to the last 29 days.

An example implementation of the information stored in an element of an input event feature vector for an automobile collision avoidance system is the count of events which consist of the number of objects that were identified to be within five meters of the automobile that within the last hour. Additional information stored in input event feature vector elements include percentages of the total number of events or slopes (derivatives). Therefore, for each output event a long feature vector is created comprising a summary of events that transpired within specific time and metric resolutions.

The input event feature vectors are then linked their respective output event (in the output event feature vector). Once the input and output event feature vectors are created, a standard learning task can be employed. Standard learning tasks include, but are not limited to classification, anomaly detection and clustering. Classification enables the creation of rules (based on input events) for generating output events. Data gathered for classification includes the times when the output events were generated as well as times (i.e. a specific time window) when no output event was generated. Anomaly detection identifies rules that predict when a system is behaving abnormally. Data Anomaly detection requires analysis of data from a system working normally for most of the time. Finally, clustering partitions sequences of event into clusters for later typification by a human operator.

The input event feature vectors are then linked to their respective output event (in the output event feature vector). Once the input and output event feature vectors are created, a standard learning task is employed. Standard learning tasks include, but are not limited to, classification, anomaly detection and clustering. Classification enables the creation of rules (based on input events) for generating output events. Data gathered for classification includes the times when the output events were generated as well as times (i.e. a specific time window) when no output event was generated. Anomaly detection identifies rules that predict when a system is behaving abnormally. Data Anomaly detection requires analysis of data from a system working normally for most of the time. Finally, clustering partitions sequences of events into clusters for later classification by a human operator.

Figure 4A:
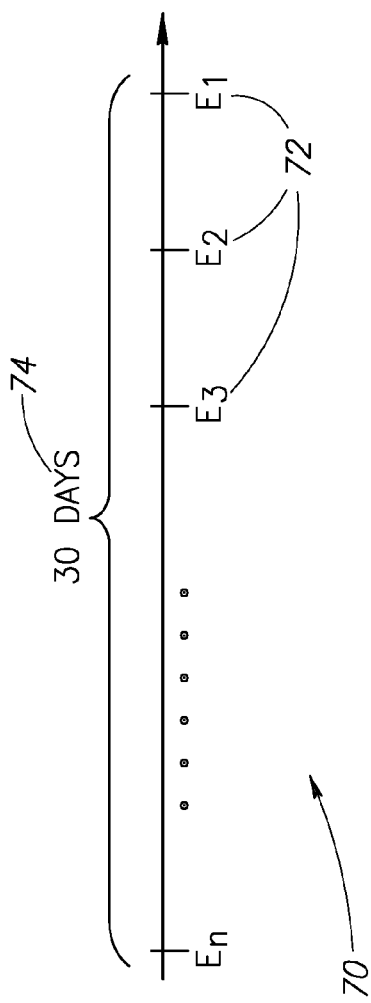
FIG. 4A is a graphical representation of an event stream utilized by the present invention.
Figure 4B:
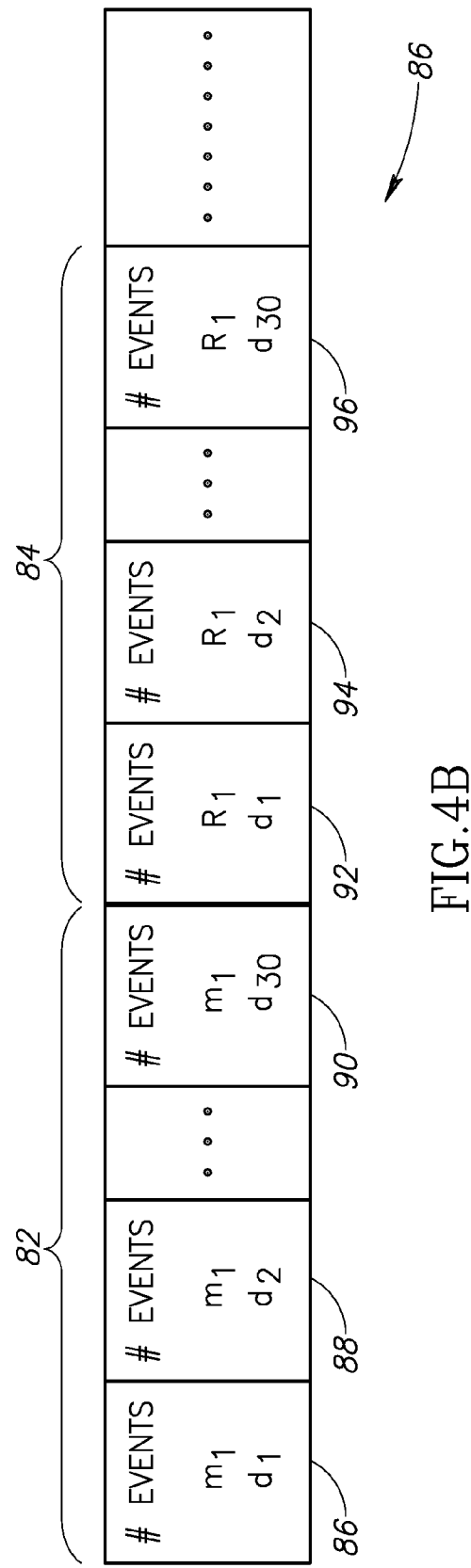
FIG. 4B is a graphical representation of an input event feature vector utilized by the present invention.

A visual representation of constructing input event feature vector for use by the present invention is shown in FIGS. 4A and 4B. The diagram, generally referenced 70, comprises a visual representation of events 72 that transpire within time 74. In this example, the input events were recorded for 30 days and each event comprises a specific distance measured and the time that the event occurred. An input event feature vector is then created, with the events grouped into one day resolutions.

The resulting input event feature vector is shown in FIG. 4B. The vector, generally referenced 80, is an input event feature vector, comprising vector subsets 82, 84 and vector elements 86, 88, 90, 92, 94, 96. Each vector element stores the number of events that occurred within a specific time period for a specific metric value, in this case distance $m_1$. In this example, vector subset 82 comprises a summary of all events that transpired within 30 days (the time window) that were within $m_1$. Vector subset 82 is further comprised of vector elements 86, 88, 90. Vector element 86 stores the number of events that were recorded on day $d_1$ that were within $m_1$, vector element 88 stores the number of events that were recorded on day $d_2$ that were within $m_1$ and vector element 90 stores the number of events that were recorded on day $d_{30}$ that were within $m_1$.

Metric $m_1$ is further divided into finer resolutions, resulting in resolutions $R_1$-$R_n$. Vector subset 84 comprises the events that were recorded over the last 30 days that were within metric $R_1$. Vector subset 84 is further comprised of vector elements 92, 94, 96. Vector element 92 stores the number of events that were recorded on day $d_1$ that were within $R_1$, vector element 94 stores the number of events that were recorded on day $d_2$ that were within $R_1$ and vector element 96 stores the number of events that were recorded on day $d_{30}$ that were within $R_1$.

The input event feature vector is completed when events within all time and metric resolutions have been recorded. An input event feature vector is created for each targeted output event, which itself may have associated parameters. All the output events and their respective input event feature vectors are then input into a standard learning algorithm to generate CEP system rules.

A sample output the present invention implemented to analyze computer system log files is shown in FIG. 5. The rule table, generally referenced 100, comprises rules 102, 104, 106, 108, 110 and 112. The rules further comprise identifier 114, category 116, criteria 118 and explanation 120.

Rule 102 states:

$$(ueventID=26(t-26)>58)\&(usource=Print(t-21)<620.5)$$

where
  t represents the number of days;
  ueventID=26 refers to a failed write;
  (usource=Print (t−21)<620.5) states that a system generating fewer than 621 "Print" events over a 21 day period is classified as a print server.

Therefore rule 102 states that if there were more than 58 "Failed Write" events in the last 26 days in a system that had fewer than 621 "Print" events in the last 21 days then there are too many failed writes for a system which is not classified as a print server.

Another rule example is rule 104 which states:

$$(time\_vec(t-22)>4854.5)$$

which states that there is a problem if there are more than 4854 recorded application events in the last 22 days.

Figure 6:
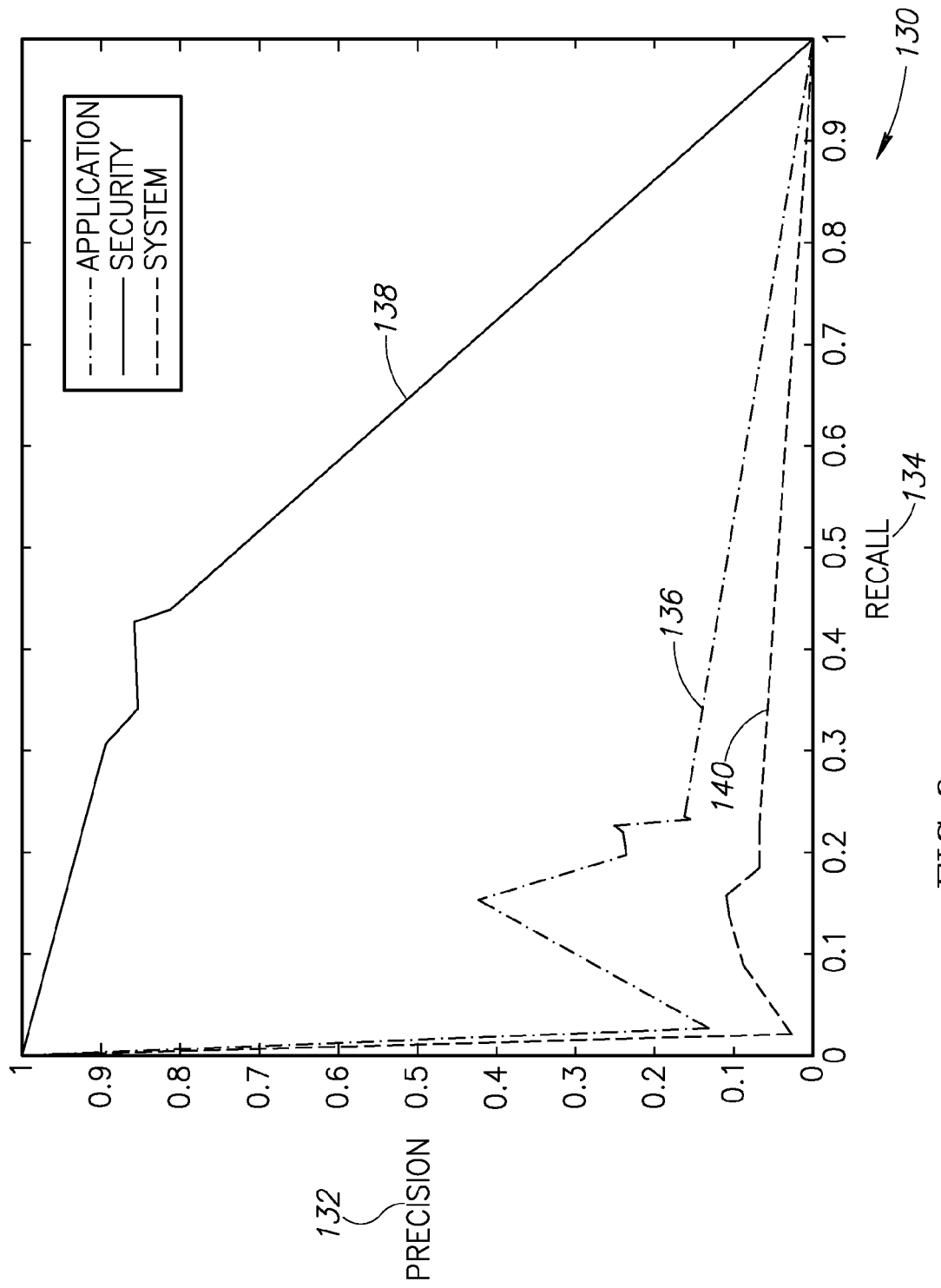
FIG. 6 is a chart representing recall and precision accuracy of rules generated by the present invention.

When creating CEP system rules, there is a balance between the number of different metrics to be used in the rules, the precision of the rules and the number of false positives the rules will identify. Fewer rules will result in fewer false positives being identified at the cost of identifying fewer events. Increasing the number of rules will increase the number of events identified at a likely cost of greater instances of false positives. The support (or strength) of a rule can be deduced by the number of events it flags in training or in validation data. Generally, it is preferred to use rules with a higher support. A graph representing rule performance for the computer log analysis discussed supra is shown in FIG. 6. The graph, generally referenced 130 comprises a chart with precision axis 132, recall axis 134, application category rule performance 136, security category rule performance 138 and system category rule performance 140. The chart shows that as recall (i.e. the number of events flagged by the rules) increases, precision (with a lower precision indicating the flagging of a greater number of false positives) decreases. Rules in the graph were sorted in accordance with their support of the training data.

Figure 7:
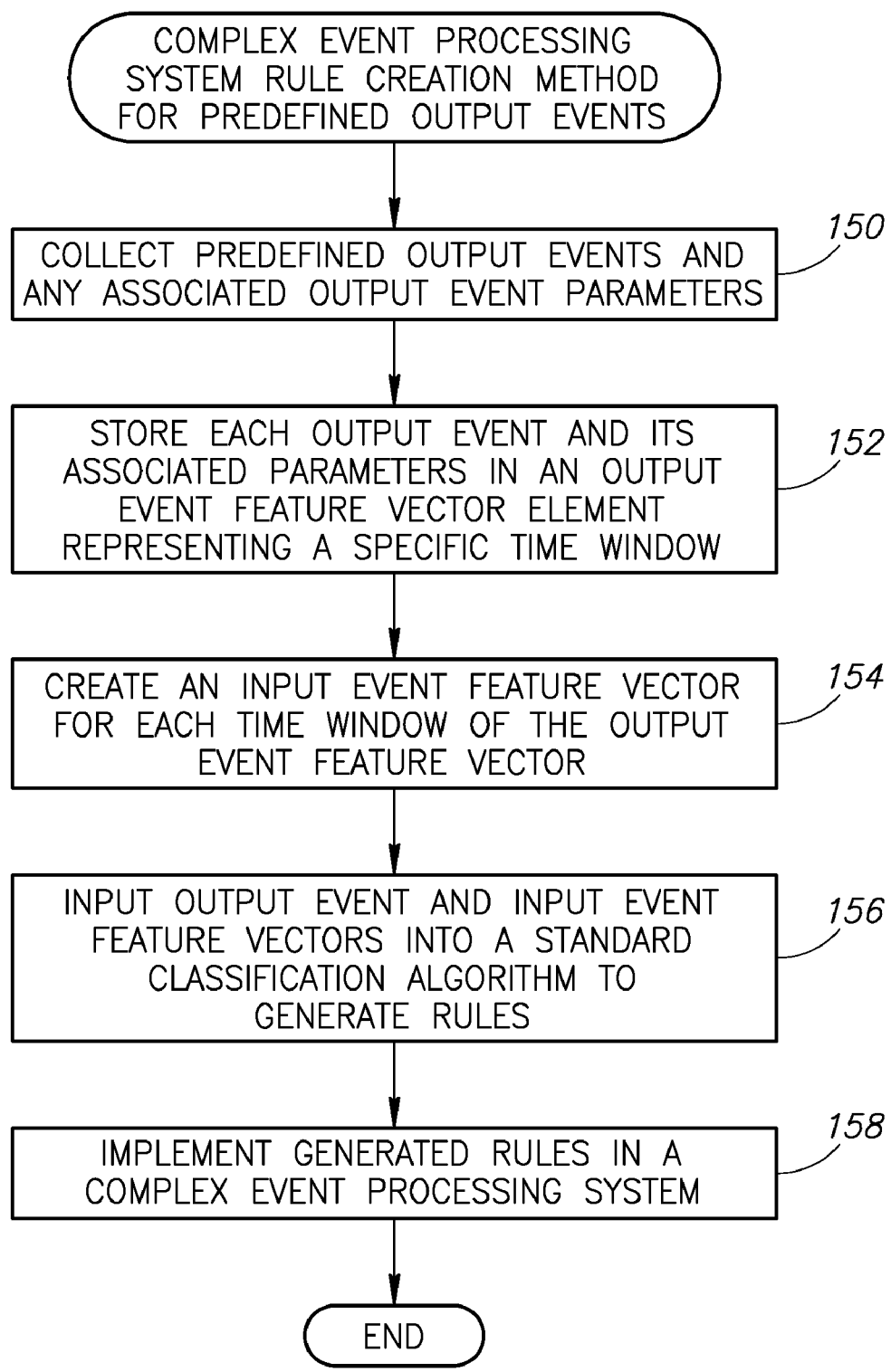
FIG. 7 is a flow diagram illustrating the complex event processing system rule creation for predefined output events method of the present invention.

A flow diagram illustrating the method of creating complex event processing system rules when output events are predefined of the present invention is shown in FIG. 7. First, output events and any associated parameters are collected (step 150) and stored in an output event feature vector, with each output event and any associated parameters stored in an output event feature vector representing a specific time window (step 152). Next, input event feature vectors are created for each time window element of the output event feature vector (step 154). The output event and input event feature vectors are then input into a standard classification algorithm (step 156) and the resulting identified rules are implemented in the event processing system (step 158).

Figure 8:
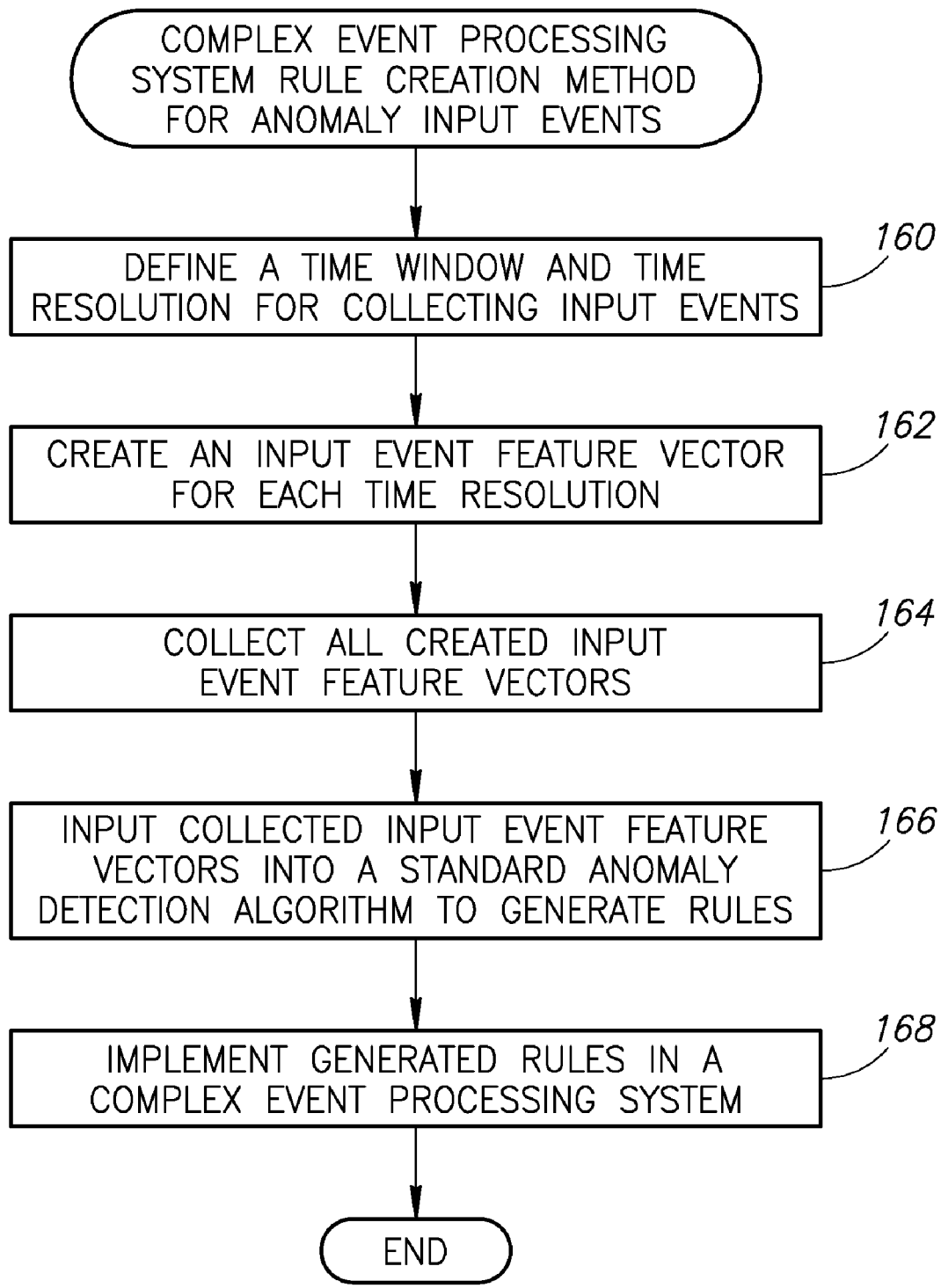
FIG. 8 is a flow diagram illustrating the complex event processing system rule creation for anomaly output events method of the present invention.

A flow diagram illustrating the method of creating event processing system rules to infer anomaly input events of the present invention is shown in FIG. 8. First, a maximal time window and minimal time resolution are defined for collecting input events (step 160). An input event feature vector is then created for each minimal time resolution (step 162). All the created input event feature vectors are then collected (step 164) and input into a standard anomaly detection algorithm to generate rules (step 166). Finally, the identified rules are implemented in a complex event processing system (step 168).

Figure 9:
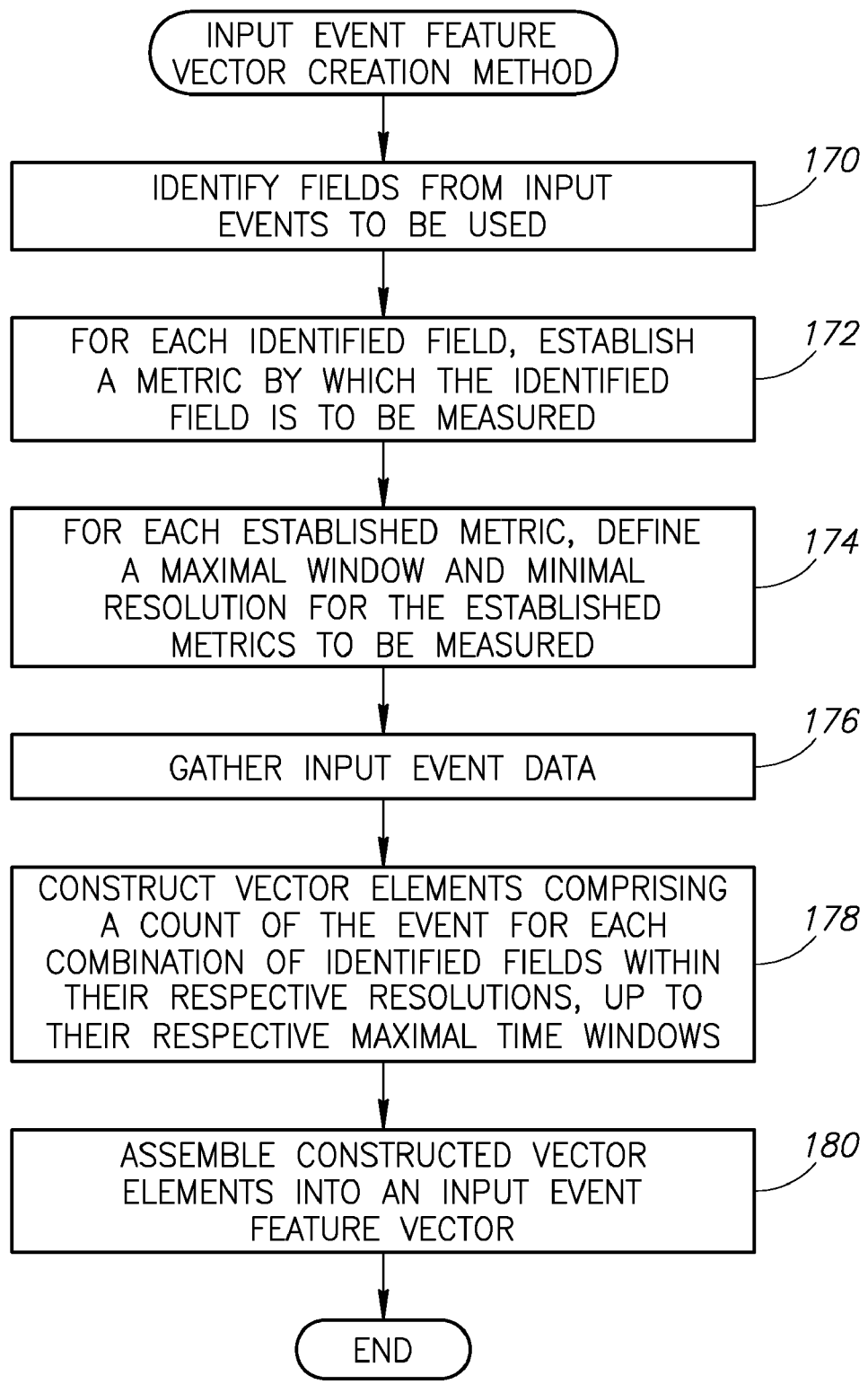
FIG. 9 is a flow diagram illustrating the input event feature vector creation method of the present invention.

A flow diagram illustrating the input event feature vector creation method of the present invention is shown in FIG. 9. First, input event fields that are to be used are identified (step 170). For each identified field, a metric is established by which the identified field is to be measured (step 172). For each established metric, maximal windows and minimal resolutions by which the established metrics are to be measured are then defined (step 174). Input event data is then gathered (step 176) and vector elements are constructed comprising a count of the events for each combination of identified fields within their respective resolutions, up to their respective maximal time windows (step 178). Finally, the constructed vector elements are then assembled to create an input event feature vector (step 180).

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of creating an input event feature vector for use as input to a standard learning algorithm implemented by a computer, said method comprising the steps of:
    defining the characteristics of said input event feature vector;
    gathering a plurality of input events;
    populating individual vector elements of said input event feature vector based on a subset of said plurality of input events; and
    constructing said input event feature vector from said individual vector elements, whereby one or more complex event rules are automatically generated by machine learning of system log data from multiple events embodied in said input event feature vector.

2. The method according to claim 1, wherein said step of defining the characteristics of said input event feature vector further comprises the steps of:
    identifying a plurality of input event fields to be measured;
    establishing a metric by which to measure each said input event field;
    defining a maximal window for each said metric; and
    defining a minimal resolution of each said metric.

3. The method according to claim 1, wherein said individual input event feature vector elements further comprise:
    parameters of said defined subset; and
    a count of said input events within said defined subset.

4. The method according to claim 3, wherein said parameters of said defined subset of said plurality of input events comprise a combination of said identified fields within each said identified field's said respective resolutions, up to each said identified field's said maximal window.

5. A method of generating one or more complex event processing system (CEP) rules for inferring a previously identified output event based on a plurality of input events implemented by a computer, said method comprising the steps of:
    creating an output event feature vector for observed instances of said previously defined output events;
    generating an input event feature vector for each observed instance of said previously defined output event; and
    executing a standard classification algorithm using said output event feature vector and said input event feature vectors as inputs, thereby extracting one or more CEP rules incorporating one or more said input events and their associated parameters, whereby one or more complex event rules are automatically generated by machine learning of system log data from multiple events embodied in said input event feature vector.

6. The method according to claim 5, wherein said output event feature vector comprises a plurality of vector elements further comprising:
    an output event;
    zero or more parameters of said output event; and
    time window of said output event.

7. The method according to claim 5, wherein said step of generating an input event feature vector comprises the steps of:
    identifying a plurality input event fields to be measured;
    establishing a metric by which to measure each said input event field;
    defining a maximal window for each said metric; and
    defining a minimal resolution of each said metric.

8. The method according to claim 5 wherein said individual input event feature vector elements further comprise:
    parameters of said defined subset; and
    a count of said input events within said defined subset.

9. The method according to claim 8, wherein said parameters of said defined subset of said plurality of input events comprise a combination of said identified fields within each said identified field's said respective resolutions, up to each said identified field's said maximal window.

10. A method of establishing complex event processing system (CEP) rules for detecting input event anomalies implemented by a computer, said method comprising the steps of:
 defining a time window and time resolution for collecting a plurality of input events;
 creating an input event feature vector for each said time resolution; and
 executing a standard anomaly detection algorithm using a plurality of said input event feature vectors as inputs, thereby extracting one or more complex event processing system rules for detection of anomaly input events, whereby one or more complex event rules are automatically generated by machine learning of system log data from multiple events embodied in said input event feature vector.

11. The method according to claim 10, wherein said step of generating an input event feature vector comprises the steps of:
 identifying a plurality input event fields to be measured;
 establishing a metric by which to measure each said input event field;
 defining a maximal window for each said metric; and
 defining a minimal resolution of each said metric.

12. The method according to claim 10, wherein said individual input event feature vector elements further comprise:
 parameters of said defined subset; and
 a count of said input events within said defined subset.

13. The method according to claim 12, wherein said parameters of said defined subset of said plurality of input events comprise a combination of said identified fields within each said identified field's said respective resolutions, up to each said identified field's said maximal window.

14. A computer program product for establishing complex event processing system rules from streams of input and output events, the computer program product comprising:
 a computer usable medium having computer usable program code embodied therewith, the computer usable program code comprising:
 computer usable program code for creating an output event feature vector;
 computer usable program code for generating an input event feature vector for each element of said output event feature vector; and
 computer usable program code for executing a standard learning algorithm using said of output event feature vector and said input event feature vectors as inputs, thereby extracting one or more complex event system processing rules, whereby one or more complex event rules are automatically generated by machine learning of system log data from multiple events embodied in said input event feature vector.

15. The computer program product according to claim 14, wherein said standard learning algorithm comprises a classification algorithm for creating one or complex event processing system rules to infer a previously defined output event.

16. The computer program product according to claim 14, wherein said standard learning algorithm comprises an anomaly detection algorithm for creating one or complex event processing system rules to infer input event anomalies.

17. The computer program product according to claim 14, wherein said output event feature vector comprises a plurality of vector elements further comprising:
 an output event;
 zero or more parameters of said output event; and
 time window of said output event.

18. The computer program product according to claim 14, wherein said step of generating an input event feature vector comprises the steps of:
 identifying a plurality input event fields to be measured;
 establishing a metric by which to measure each said input event field;
 defining a maximal window for each said metric; and
 defining a minimal resolution of each said metric.

19. The computer program product according to claim 14, wherein said individual input event feature vector elements further comprise:
 parameters of said defined subset; and
 a count of said input events within said defined subset.

20. The computer program product according to claim 19, wherein said parameters of said defined subset of said plurality of input event s comprise a combination of said identified fields within each said identified field's said respective resolutions, up to each said identified field's said maximal window.

\* \* \* \* \*